United States Patent
Hirawaki et al.

(10) Patent No.: US 11,203,136 B2
(45) Date of Patent: Dec. 21, 2021

(54) PRODUCTION METHOD FOR THE THERMOPLASTIC RESIN COMPOSITE MATERIAL

(71) Applicants: HONDA MOTOR CO., LTD., Tokyo (JP); SUBARU CORPORATION, Tokyo (JP); SUZUKI MOTOR CORPORATION, Hamamatsu (JP);
(Continued)

(72) Inventors: Satoshi Hirawaki, Saitama (JP); Yasunari Kuratani, Hyogo (JP); Masashi Horikawa, Niigata (JP); Tomomi Ichida, Shizuoka (JP); Kazuaki Amaoka, Aichi (JP); Takashi Kusaka, Tokyo (JP); Yoshinori Yamamori, Tokyo (JP); Kosuke Sakurai, Aichi (JP)

(73) Assignees: HONDA MOTOR CO., LTD., Tokyo (JP); SUBARU CORPORATION, Tokyo (JP); SUZUKI MOTOR CORPORATION, Hamamatsu (JP);
(Continued)

( * ) Notice: Subject to any disclaimer, the term of this patent is extended or adjusted under 35 U.S.C. 154(b) by 256 days.

(21) Appl. No.: 16/309,678

(22) PCT Filed: May 11, 2017

(86) PCT No.: PCT/JP2017/017897
§ 371 (c)(1),
(2) Date: Dec. 13, 2018

(87) PCT Pub. No.: WO2017/217153
PCT Pub. Date: Dec. 21, 2017

(65) Prior Publication Data
US 2019/0118427 A1    Apr. 25, 2019

(30) Foreign Application Priority Data

Jun. 17, 2016 (JP) .............................. JP2016-120501

(51) Int. Cl.
B29C 43/18 (2006.01)
B29C 43/34 (2006.01)
(Continued)

(52) U.S. Cl.
CPC ............ *B29C 43/18* (2013.01); *B29B 13/022* (2013.01); *B29C 43/34* (2013.01);
(Continued)

(58) Field of Classification Search
None
See application file for complete search history.

(56) References Cited

U.S. PATENT DOCUMENTS 2,874,419 A * 2/1959 May ........................ B29C 43/18
264/132
3,309,448 A * 3/1967 Paulk .................... B29C 43/146
264/245
(Continued)

FOREIGN PATENT DOCUMENTS

DE    102011056029 A1    6/2013
DE    102014222243    *   5/2016
(Continued)

OTHER PUBLICATIONS

European Search Report dated Jan. 21, 2020, 8 pages.
(Continued)

*Primary Examiner* — Edmund H Lee
(74) *Attorney, Agent, or Firm* — Rankin, Hill & Clark LLP (57) ABSTRACT

A method of producing thermoplastic resin composite material in which a main base material containing thermoplastic
(Continued)

resin and a sheet-like shaped auxiliary base material are integrally molded and are made into composite material. The production method includes the steps of: heating the auxiliary base material (step S1); disposing the heated auxiliary base material in a mold (step S2); disposing the main base material in the mold via the auxiliary base material (step S3); closing the mold, and pressing together and integrally molding the auxiliary base material and the main base material (step S4); and taking out the integrally-molded thermoplastic resin composite material from the mold.

4 Claims, 8 Drawing Sheets

(71) Applicants: TOYOTA JIDOSHA KABUSHIKI KAISHA, Toyota (JP); TEIJIN LIMITED, Osaka (JP); Toray Industries, Inc., Tokyo (JP); KYOWA INDUSTRIAL CO., LTD., Sanjo (JP); NATIONAL UNIVERSITY CORPORATION NAGOYA UNIVERSITY, Nagoya (JP)

(73) Assignees: TOYOTA JIDOSHA KABUSHIKI KAISHA, Aichi (JP); TEIJIN LIMITED, Osaka (JP); TORAY INDUSTRIES, INC., Tokyo (JP); KYOWA INDUSTRIAL CO., LTD., Sanjo (JP); NATIONAL UNIVERSITY CORPORATION NAGOYA UNIVERSITY, Nagoya (JP)

(51) Int. Cl.
*B29B 13/02* (2006.01)
*B29K 101/12* (2006.01)
*B29K 105/12* (2006.01)
*B29K 307/04* (2006.01)

(52) U.S. Cl.
CPC ... *B29C 2043/3411* (2013.01); *B29K 2101/12* (2013.01); *B29K 2105/12* (2013.01); *B29K 2307/04* (2013.01)

(56) References Cited

U.S. PATENT DOCUMENTS

| | | | |
|---|---|---|---|
| 3,523,993 A | | 8/1970 | Hawkins |
| 3,597,425 A | * | 8/1971 | Shaines ................. B29C 43/146 264/246 |
| 3,906,072 A | * | 9/1975 | Haas ....................... B29C 43/52 264/322 |
| 5,421,940 A | | 6/1995 | Cornils et al. |
| 5,614,285 A | * | 3/1997 | Gardill .................. B29C 70/345 428/156 |
| 5,718,791 A | * | 2/1998 | Spengler ............... B29C 63/025 156/212 |
| 2004/0175533 A1 | | 9/2004 | Yamane et al. |
| 2014/0102630 A1 | * | 4/2014 | Tsai ....................... B29C 43/146 156/245 |
| 2015/0064410 A1 | | 3/2015 | Fitchett et al. |
| 2015/0321395 A1 | * | 11/2015 | Preisler .................. B29C 43/18 264/511 |
| 2016/0318686 A1 | * | 11/2016 | Russell ................. B65D 1/0246 |
| 2017/0368767 A1 | | 12/2017 | Fitchett et al. |

FOREIGN PATENT DOCUMENTS

| | | |
|---|---|---|
| EP | 2825372 A1 | 1/2015 |
| JP | 01-052713 U | 3/1989 |
| JP | 04-79611 U | 7/1992 |
| JP | H10-58613 | 3/1998 |
| JP | H11-268066 | 10/1999 |
| JP | H11-320591 | 11/1999 |
| JP | 2004-262120 | 9/2004 |
| JP | 2010-155403 | 7/2010 |
| JP | 2011-037032 A | 2/2011 |
| KR | 100272021 B1 | 11/2000 |

OTHER PUBLICATIONS

Indian Office Action dated May 28, 2020, includes English Text, 6 pages.
International Search Report, International Application No. PCT/JP2017/017897 dated Jun. 27, 2017, 2 pages.

* cited by examiner

PRODUCTION METHOD FOR THE THERMOPLASTIC RESIN COMPOSITE MATERIAL

TECHNICAL FIELD

The present invention relates to a production method and a production device for thermoplastic resin composite material.

BACKGROUND ART

New innovative structural materials for making a vehicle or the like lighter in weight have been developed in recent years so as to reduce energy usage and $CO_2$ emission. In particular, carbon fiber reinforced plastics (CFRP) is promising material for application to a vehicle component member because of its excellent material property.

As a conventional production method for the carbon fiber reinforced plastics, for example, RTM (Resin Transfer Molding) method, SMC (Sheet Molding Compound) method, and the like have been known (see, for example, Patent Document 1 and Patent Document 2). Using those production methods, thermosetting resin composite material in which thermosetting resin as a matrix contains carbon fiber can be obtained by means of mold forming.

RELATED ART DOCUMENTS

Patent Documents

Patent Document 1: Japanese Laid-Open Patent Application, Publication No. 2010-155403
Patent Document 2: Japanese Laid-Open Patent Application, Publication No. 2004-262120

SUMMARY OF THE INVENTION

Problems to be Solved by the Invention

The above-described thermosetting resin composite material requires, however, a heating step for setting the matrix at a time of mold forming. Therefore, there is a problem that manufacture of thermosetting resin composite material is, in general, poor in productivity (or a molding cycle time), compared to that of composite material obtained by press molding method or the like using thermoplastic resin.

Thus, application of thermoplastic resin composite material in which thermoplastic resin as a matrix contains reinforcing material such as carbon fiber, to a vehicle component member has been considered in terms of improvement in productivity.

In view of the application to a vehicle component member, however, besides the productivity, thermoplastic resin composite material requires such functions as high mechanical strength, incombustibility, corrosion resistance, and impact resistance. In order to ensure the functions as described above, it is necessary to set a volume fraction (Vf) of reinforcing material in thermoplastic resin composite material at a relatively high level.

If the volume fraction of the reinforcing material in the thermoplastic resin composite material is made high, however, fluidity of thermoplastic resin thereof in a mold becomes insufficient, which may cause a weld line, a sink, or the like.

In light of the described above, the present invention has been made in an attempt to provide a production method and a production device for thermoplastic resin composite material, each of which has high productivity and can keep fluidity of thermoplastic resin in a mold in good state.

Means for Solving the Problems

A production method for thermoplastic resin composite material of the present invention for solving the above-described problems is a method of producing thermoplastic resin composite material in which main base material containing thermoplastic resin and sheet-like shaped auxiliary base material are integrally molded and are made into composite material. The production method includes the steps of: heating the auxiliary base material; disposing the heated auxiliary base material in a mold; disposing the main base material in the mold via the auxiliary base material; closing the mold, and pressing together and integrally molding the auxiliary base material and the main base material; and taking out the integrally-molded thermoplastic resin composite material from the mold.

A production device for thermoplastic resin composite material for solving the above-described problems is a device for producing thermoplastic resin composite material in which main base material containing thermoplastic resin and sheet-like shaped auxiliary base material are integrally molded and are made into composite material. The production device includes: a mold that is configured to integrally mold the main base material and the auxiliary base material; a transfer mechanism that is configured to dispose the previously-heated auxiliary base material in the mold and to dispose the main base material in the mold via the auxiliary base material; and a press mechanism that is configured to press the auxiliary base material against the mold before the main base material is disposed in the mold.

In the present invention, in disposing main base material containing thermoplastic resin in a mold, the main base material is disposed therein via auxiliary base material which has been previously heated. This makes it possible to keep fluidity of the thermoplastic resin in the mold in good state by means of heat of the auxiliary base material.

In the present invention, thermoplastic resin composite material can be obtained by pressing together and integrally molding main base material containing thermoplastic resin and auxiliary base material in a mold. In the present invention, unlike in a production method for thermosetting resin composite material (see, for example, Patent Documents 1 and 2), a molded object can be obtained without the heating step described above, which results in a high productivity.

Advantageous Effects of the Invention

The present invention can provide a production method and a production device for thermoplastic resin composite material, each of which has high productivity and can keep high fluidity of thermoplastic resin in a mold.

EMBODIMENTS FOR CARRYING OUT THE INVENTION

Next is described in detail a production method and a production device for thermoplastic resin composite material according to an embodiment of the present invention. First, thermoplastic resin composite material obtained by the production method is described below, and then, the production method and the production device are explained.

<Thermoplastic Resin Composite Material>

The thermoplastic resin composite material according to this embodiment is intended to be used for a vehicle component member. The vehicle component member includes, for example, a vehicle frame member such as a panel member, a side sill, a center pillar, and a floor cross member. The thermoplastic resin composite material in this embodiment is not, however, limited to be used only for the vehicle component member as described above. The thermoplastic resin composite material can be applied to, for example: a component member of a moving body other than a vehicle, such as a ship and an aircraft; and a component member of, for example, a building, a device, and an equipment of various types.

Figure 1:
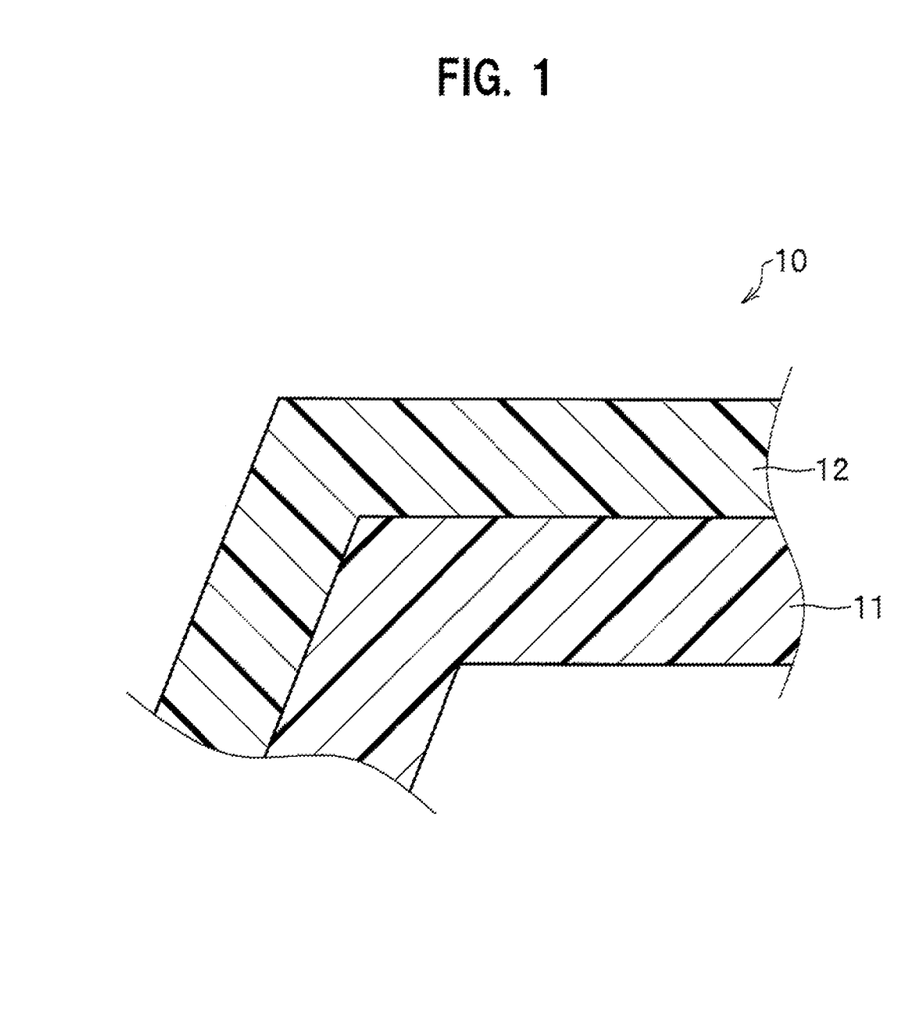
FIG. 1 is a partial cross-sectional diagram illustrating thermoplastic resin composite material obtained by a production method according to an embodiment of the present invention.

FIG. 1 is a partial cross-sectional diagram illustrating thermoplastic resin composite material 10 obtained by the production method according to this embodiment.

As illustrated in FIG. 1, the thermoplastic resin composite material 10 is an integrally molded object composed of main base material 11 and auxiliary base material 12.

The main base material 11 in this embodiment contains thermoplastic resin. The main base material 11 makes a shape of the thermoplastic resin composite material 10. More specifically, the main base material 11: flows in a mold when thermoplastic resin composite material 10 is molded, which is to be described later; thereby becomes integral with the auxiliary base material 12; and forms a rough contour of the thermoplastic resin composite material 10, together with the auxiliary base material 12.

The main base material 11: contains at least thermoplastic resin; may contain only the thermoplastic resin; and may contain filling material in addition to the thermoplastic resin.

The thermoplastic resin include, for example, but not be limited to: crystalline resin such as high-density polyethylene, low-density polyethylene, polypropylene, polyamide resin, polyacetal, polyethylene terephthalate, polybutylene terephthalate, polyphenylene sulfide, and polyetheretherketone; and non-crystalline resin such as polystyrene, polyvinyl chloride, AS resin, ABS resin, acrylic resin, polycarbonate, and modified polyphenylene ether.

The filling material is preferably fiber. The fiber includes, for example, but not limited to, carbon fiber, glass fiber, and aramid fiber.

The fiber is preferably carbon fiber. Short fiber having a fiber length equal to or smaller than 20 mm is more preferable. Such carbon fiber may be derived from either PAN or pitch.

When the main base material 11 contains filling material, a content of the filling material can be set appropriately depending on usage of the thermoplastic resin composite material 10. When the main base material 11 contains carbon fiber and is intended to be applied to a vehicle component member, a volume fraction (Vf) of the carbon fiber in the main base material 11 is preferably set at equal to or higher than 20% and equal to or lower than 60%. As described hereinafter, when the auxiliary base material 12 contains carbon fiber, a volume fraction (Vf) of the carbon fiber in the entire thermoplastic resin composite material 10 is preferably set at equal to or higher than 20% and equal to or lower than 60%. The volume fraction (Vf) of the carbon fiber is used herein for the same meaning as a fiber volume content (Vf) specified in the JIS K 7035 (2014).

When the thermoplastic resin composite material 10 is used for a vehicle component member, the auxiliary base material 12 in this embodiment forms a side nearer to a surface of the vehicle component member.

The auxiliary base material 12 is disposed along a cavity of a mold as described in detail hereinafter. The auxiliary base material 12 has a sheet-like shape and is high in mold conforming capability.

The auxiliary base material 12 is on the surface side of the thermoplastic resin composite material 10 and gives thermoplastic resin composite material 10 an added value. More specifically, the auxiliary base material 12 gives such functions as rigidity, incombustibility, corrosion resistance, impact resistance, and design property to the surface side of the thermoplastic resin composite material 10, depending on the aforementioned usage of the thermoplastic resin composite material 10.

The auxiliary base material 12 includes, for example, but not limited to, thermoplastic resin-containing sheet, metal film, and resin film. The auxiliary base material 12 illustrated in FIG. 1 is assumed to be a thermoplastic resin-containing sheet, which is to be described hereinafter, and is hatched for indicating resin.

The auxiliary base material 12 intended for application to a vehicle component member is preferably a thermoplastic resin-containing sheet containing fiber. The thermoplastic resin and the fiber used herein can be that used for the main base material 11 as described above. In particular, the auxiliary base material 12 containing carbon fiber and thermoplastic resin is more preferable.

Thermoplastic resin used for the main base material 11 and that used for the auxiliary base material 12 are preferably of the same type. That is, if, for example, polyamide resin is used for the main base material 11, polyamide resin is preferably used also for the auxiliary base material 12.

A content of the carbon fiber in the aforementioned auxiliary base material 12 is, as described above, preferably set at equal to or higher than 20% and equal to or lower than 60% of a volume fraction (Vf) of the carbon fiber in the entire thermoplastic resin composite material 10.

When the auxiliary base material 12 is intended to be applied to a vehicle component member, a volume fraction (Vf) of carbon fiber in the auxiliary base material 12 is preferably set higher than that in the main base material 11 so as to provide the surface side of the thermoplastic resin composite material 10 with strength, rigidity, or the like against collision load.

More specifically, a ratio ($Vf_S/Vf_F$) of a volume fraction ($Vf_S$) of carbon fiber in the auxiliary base material 12 to a volume fraction ($Vf_M$) of carbon fiber in the main base material 11 is preferably set at higher than 1 and equal to or lower than 2.5.

When the ratio is set as described above, the thermoplastic resin composite material 10 in this embodiment can further improve strength, rigidity, or the like thereof against collision load, and can further keep high fluidity of thermoplastic resin in a mold at a time of molding to be described hereinafter.

When the volume fraction ($Vf_S$) of carbon fiber in the auxiliary base material 12 is set higher than the volume fraction ($Vf_M$) of carbon fiber in the main base material 11, surface roughness on a side nearer to the main base material 11 of the auxiliary base material 12 can be made higher. This also contribute to a possible anchor effect (an increase in bond strength at interface) by the thermoplastic resin on the main base material 11 side.

In this case, the above-described ratio ($Vf_S/Vf_F$) is preferably equal to or higher than 1.3.

<Production Device for Thermoplastic Resin Composite Material>

Next is described a production device for thermoplastic resin composite material.

Figure 2:
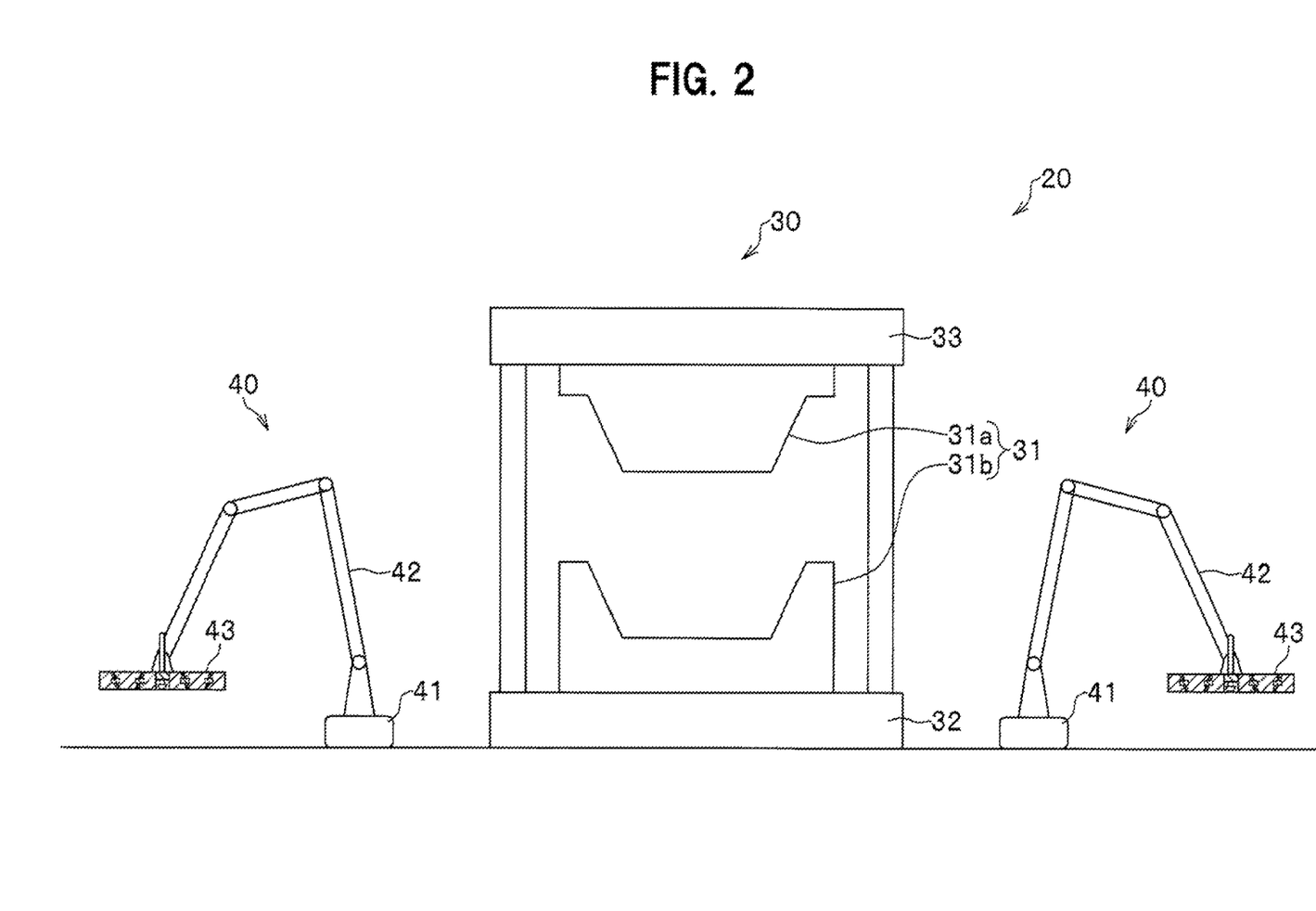
FIG. 2 is an explanatory diagram illustrating a structure of a production device for thermoplastic resin composite material according to the embodiment of the present invention.
Figure 3:
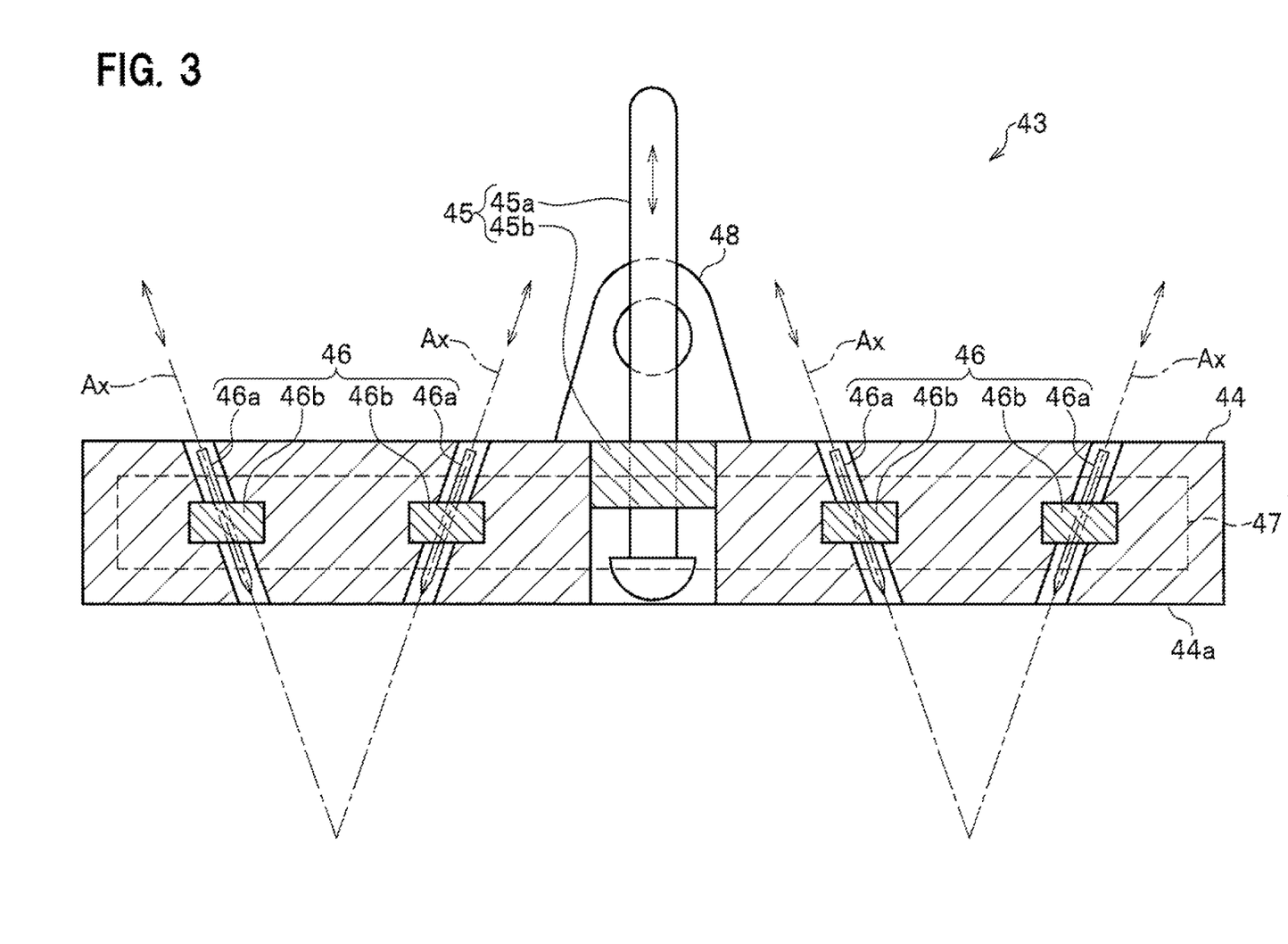
FIG. 3 is an explanatory diagram illustrating a structure of a hand part of a robot hand mechanism constituting the production device of FIG. 2.

FIG. 2 is an explanatory diagram illustrating a structure of a production device 20 used in the production method according to this embodiment. FIG. 3 is an explanatory diagram illustrating a structure of a hand part 43 of a material handling robot 40 (a transfer mechanism) constituting the production device 20 of FIG. 2.

As illustrated in FIG. 2, the production device 20 includes a press mechanism 30 and a pair of material handling robots 40.

The press mechanism 30 includes, as major parts thereof: a mold 31 that includes an upper mold 31a and a lower mold 31b; a base 32 that supports the lower mold 31b; and a lifting and lowering part 33 that supports the upper mold 31a above the lower mold 31b and moves the upper mold 31a up and down with respect to the lower mold 31b.

When the upper mold 31a is situated on top of the lower mold 31b in an up-and-down direction, the mold 31 has a cavity formed inside thereof. When the lifting and lowering part 33 presses down the upper mold 31a against the lower mold 31b on the base 32 at a prescribed pressure, molding material disposed in the cavity is press-molded.

The material handling robot 40 (the transfer mechanism) includes, as major parts thereof, a support part 41, an arm part 42, a hand part 43, and a drive part (not illustrated).

The material handling robot 40 is structured such that the hand part 43 three-dimensionally moves about the support part 41 via the arm part 42. The drive part (not illustrated): is composed of known parts such as an air cylinder, a gear, and a cam; and makes the hand part 43 three-dimensionally move as described above.

As illustrated in FIG. 3, the hand part 43 includes a main body 44, a pusher 45 (a press mechanism), a holding unit 46, and a heater 47.

The main body 44 in this embodiment is formed in shape of a thin rectangular solid and defines a substantial contour of the hand part 43. An attaching unit 48 is disposed at a substantial center on one end face in a thickness direction of the main body 44. The attaching unit 48 is used for attaching the main body 44 to a front edge of the arm part 42 (see FIG. 2). It is to be noted that an attaching angle of the main body 44 in this embodiment to the arm part 42 (see FIG. 2) can be changed via a prescribed actuator (not illustrated).

In the production method to be described later, each of the main base material 11 (see FIG. 1) and the auxiliary base material 12 (see FIG. 1) is disposed on an other end face 44a in the thickness direction of the main body 44 (which is a face opposite to the one end face on which the attaching unit 48 is disposed, and may also be simply referred to as the other end face 44a of the main body 44).

The pusher 45 includes a rod member 45a and an actuator 45b.

The rod member 45a is disposed so as to penetrate the main body 44 in the thickness direction thereof. The rod member 45a is attached to the main body 44 via the actuator 45b.

The rod member 45a can be moved in the thickness direction of the main body 44 by the actuator 45b.

As illustrated in FIG. 3, the rod member 45a in a default position does not project from the other end face 44a of the main body 44. When driven by the actuator 45b, the rod member 45a projects from the other end face 44a of the main body 44 to outside (which is downside with respect to the plane of FIG. 3).

The projected rod member 45a presses the auxiliary base material 12 (see FIG. 1) toward the lower mold 31b as hereinafter described.

It is assumed herein that the main body 44 in this embodiment includes one unit of the pusher 45. The main body 44 may be, however, configured to include two or more units of the pushers 45.

The holding unit 46 includes: a pair of needle members 46a; and an actuator 46b disposed for each of the needle members 46a. The main body 44 in this embodiment includes two pairs of the holding units 46.

A pair of the needle members 46a is disposed so as to penetrate the main body 44 in the thickness direction thereof. More specifically, a pair of the needle members 46a is disposed such that respective axes Ax thereof are intersect with each other on a side nearer to the other end face 44a of the main body 44. The needle member 46a on the side on which the axes are intersect with each other has a sharp tip end.

The needle member 46a is fixed into the main body 44 via the actuator 46b.

Each of the needle members 46a can be moved in an axis Ax direction by the actuator 46b.

As illustrated in FIG. 3, the needle member 46a situated at the default position does not project from the other end face 44a of the main body 44. When driven by the actuator 46b, the needle member 46a projects from the other end face 44a of the main body 44 to the outside (downside with respect to the plane of FIG. 3).

The projected needle member 46a sticks the main base material 11 (see FIG. 1) or the auxiliary base material 12 (see FIG. 1), which is to be described hereinafter. This allows the holding unit 46 to hold the main base material 11 or the auxiliary base material 12 on the side nearer to the other end face 44a of the main body 44.

It is assumed herein that the main body 44 in this embodiment includes two pairs of the holding units 46 as described above. The main body 44 may be, however, configured to include three or more pairs of the holding units 46.

The structure of the holding unit 46 is not limited to the described above, and any other structure is possible as long as the main base material 11 or the auxiliary base material 12 can be held on the other end face 44a side of the main body 44. The holding unit 46 can be modified in accordance with a shape of the main base material 11 or the auxiliary base material 12 as appropriate. The holding unit 46 can also be substituted by any other appropriate holding unit having a clamping mechanism, a suction mechanism, or the like.

The heater 47 is embedded in the main body 44. The heater 47 keeps the main base material 11 (see FIG. 1) or the auxiliary base material 12 (see FIG. 1) disposed on the other end face 44a side of the main body 44 warm.

It is assumed herein that the heater 47 in this embodiment is an electric heater. The heater 47 is not, however, limited to this, and a fan heater, an infrared heater, or the like can also be used.

<Production Method for Thermoplastic Resin Composite Material>

Next is described the production method for the thermoplastic resin composite material 10 (see FIG. 1) according to this embodiment. In this embodiment, the production method is explained by taking an example in which: the main base material 11 (see FIG. 1) containing thermoplastic resin and short carbon fiber; and the auxiliary base material 12 (see FIG. 1) composed of a thermoplastic resin-containing sheet containing thermoplastic resin and short carbon fiber are used as raw materials.

Figure 4:
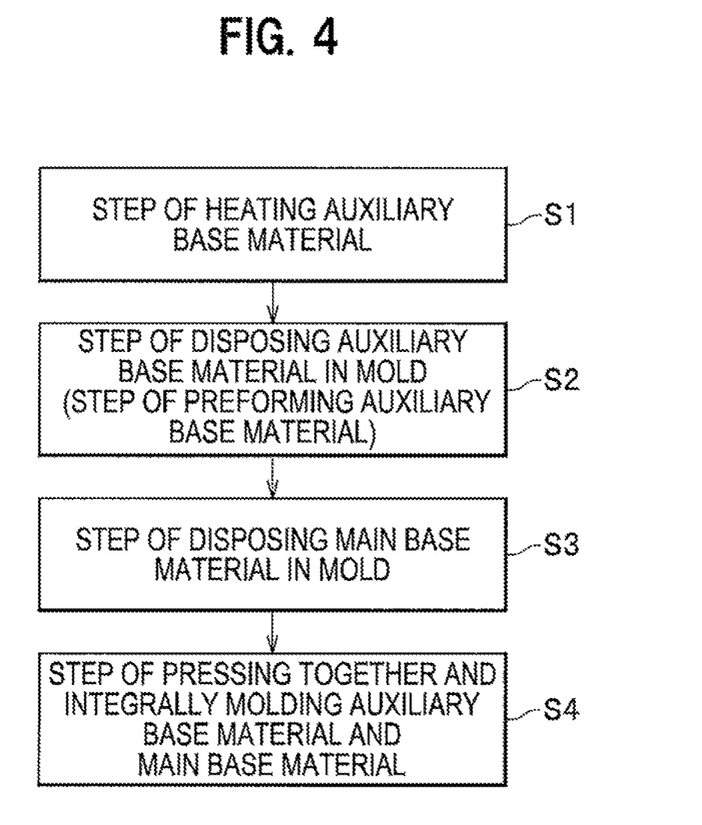
FIG. 4 is a flowchart illustrating the production method according to the embodiment of the present invention.
Figure 5:
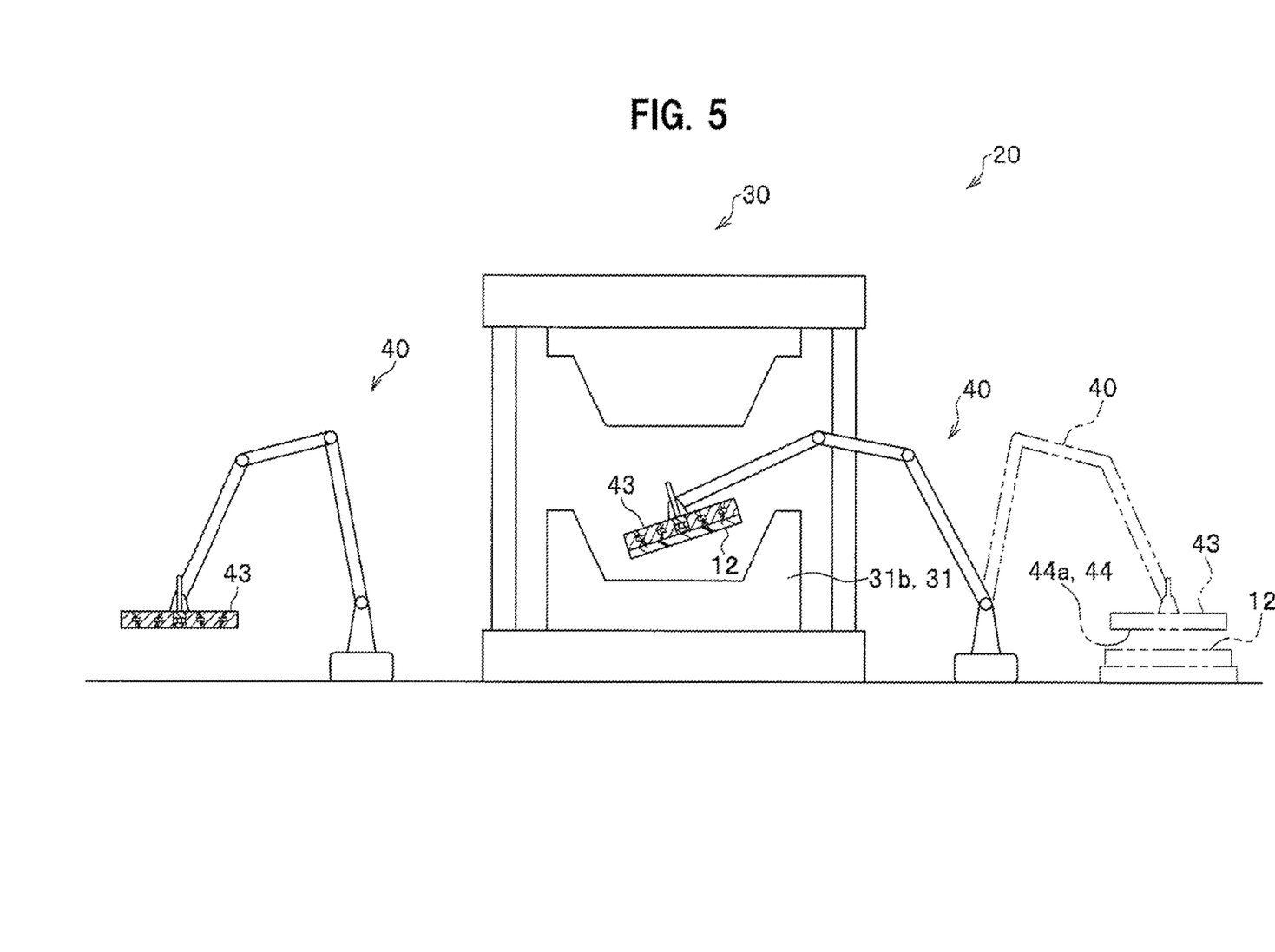
FIG. 5 is an explanatory diagram illustrating operations of the production device in a step of disposing auxiliary base material of the production method according to the embodiment of the present invention.
Figure 6:
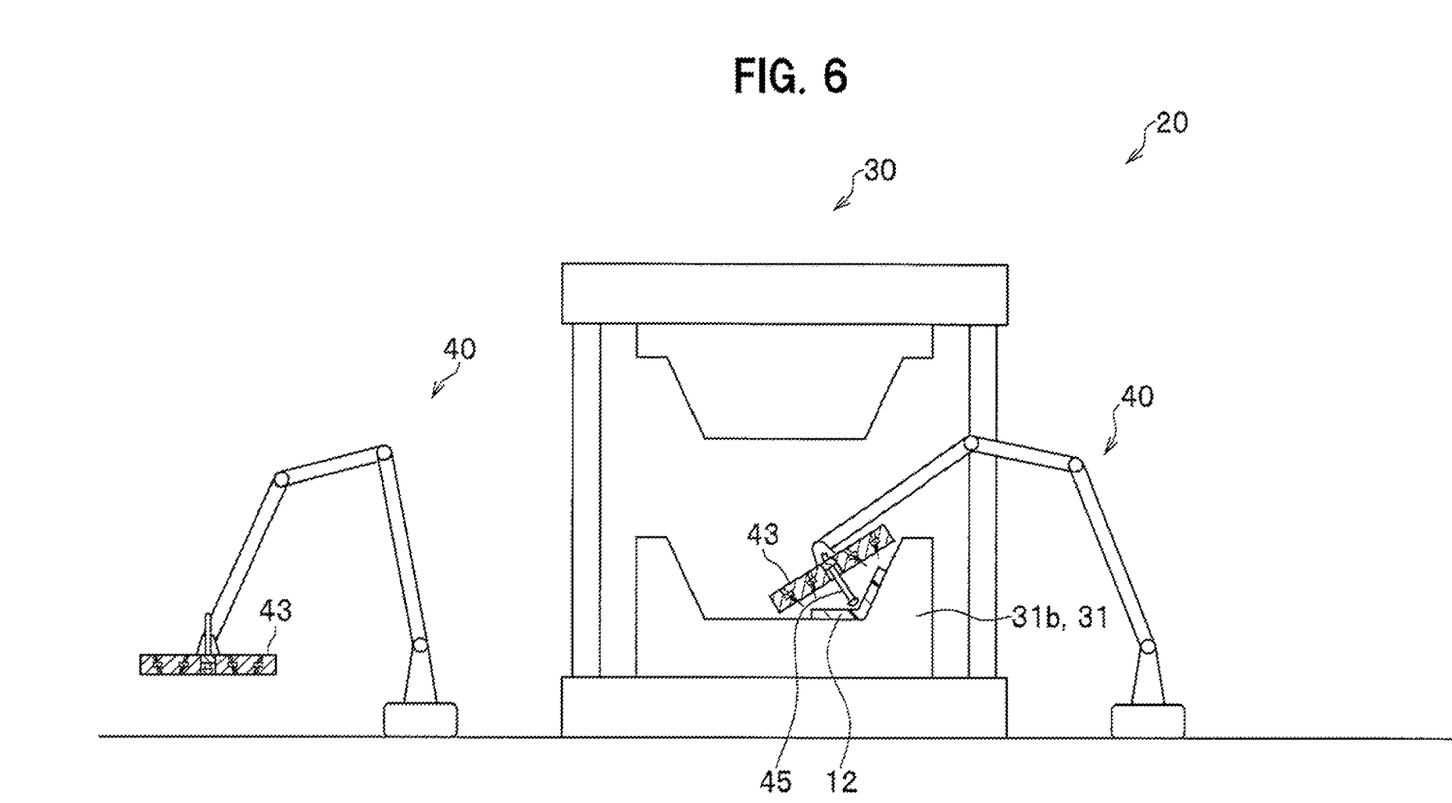
FIG. 6 is an explanatory diagram illustrating operations of the production device in a step of preforming the auxiliary base material of the production method according to the embodiment of the present invention.
Figure 7A:
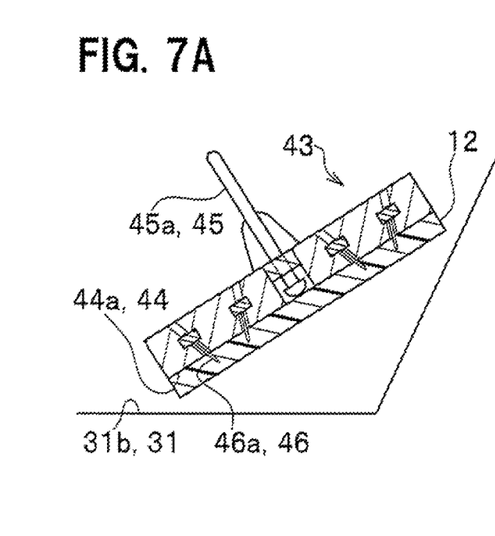
FIGS. 7A to 7C are each an explanatory diagram illustrating operations of the hand part in the step of preforming the auxiliary base material.
Figure 7B:
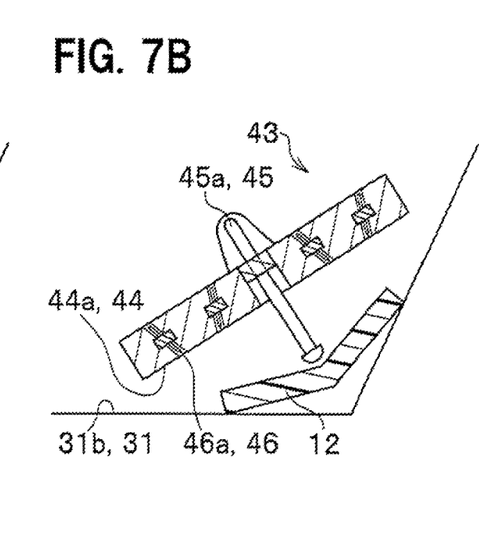
Figure 7C:
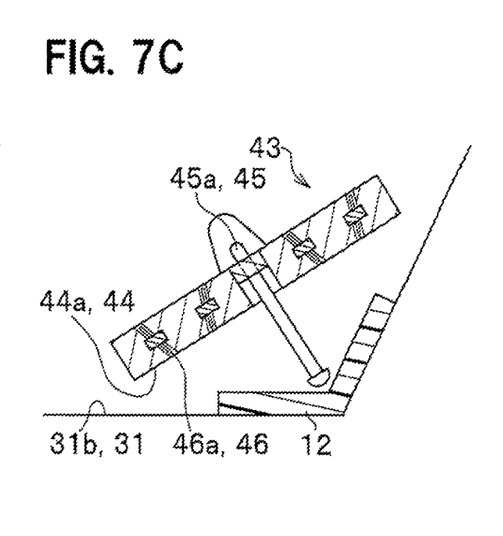
Figure 8:
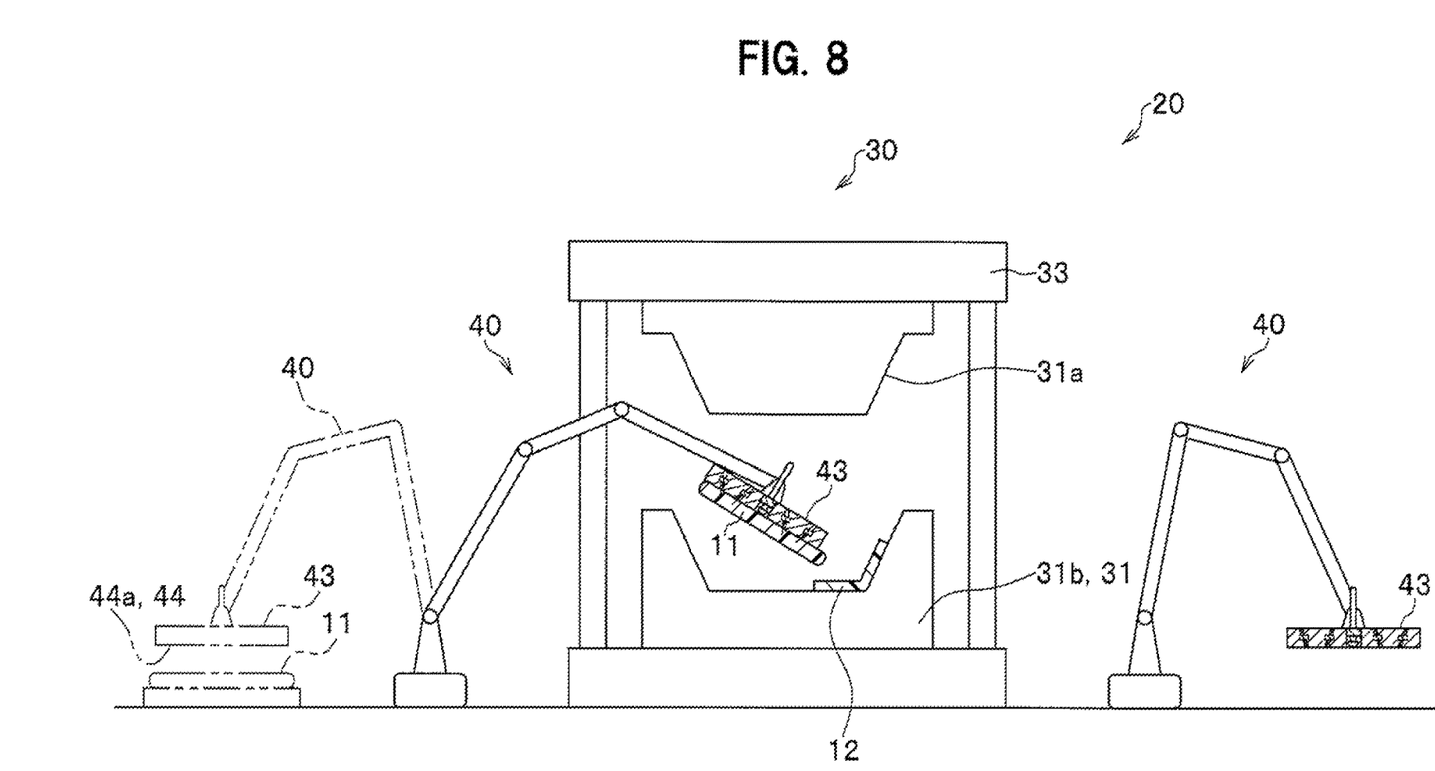
FIG. 8 is an explanatory diagram illustrating operations of the production device in a step of disposing main base material of the production method according to the embodiment of the present invention.

FIG. 4 is a flowchart illustrating the production method according to this embodiment. FIG. 5 is a diagram illustrating operations of the production device 20 (see FIG. 2) in a step of disposing the auxiliary base material 12 (see FIG. 1) of the production method. FIG. 6 is a diagram illustrating operations of the production device 20 (see FIG. 2) in a step of preforming the auxiliary base material 12 (see FIG. 1) of the production method. FIG. 7A to FIG. 7C are each a diagram illustrating operations of the hand part 43 (FIG. 3) in the step of preforming the auxiliary base material 12 (see FIG. 1). FIG. 8 is a diagram illustrating operations of the production device 20 (see FIG. 2) in a step of disposing the main base material 11 (see FIG. 1) of the production method.

As illustrated in FIG. 4, the production method in this embodiment includes: a step of heating auxiliary base material (step S1); a step of disposing the auxiliary base material into a mold (step S2); a step of disposing main base material into a mold via the auxiliary base material (step S3); and a step of integral press molding the auxiliary base material and the main base material in the mold (step S4). It is to be noted that the step of disposing the auxiliary base material (step S2) includes a step of performing the auxiliary base material to be described hereinafter.

In the production method in this embodiment, first, the auxiliary base material 12 (see FIG. 1) is preparatorily heated (see step S1 of FIG. 4).

The heating step is sufficiently completed when the auxiliary base material 12 has become heated before the main base material 11 is put on top of the auxiliary base material 12, which is to be described later. The auxiliary base material 12 has preferably become heated, however, before the auxiliary base material 12 is disposed in the mold 31 (see FIG. 2).

The heating step in this embodiment is assumed to be performed in a manufacturing device (not illustrated) of the auxiliary base material 12. More specifically, the heating step covers a step, for example, from when raw materials containing thermoplastic resin are kneaded in the manufacturing device (not illustrated) of the auxiliary base material 12 under heating, until just before the kneaded raw materials are extruded out of the manufacturing device as the auxiliary base material 12.

For example, a LFT-D (Long Fiber Thermoplastic-Direct) extruder manufactured by combining a twin-screw melt kneader for thermoplastic resin pellet and a shredder of long carbon fiber fed from carbon fiber roving can be suitably used as the manufacturing device for the auxiliary base material 12.

The step of heating the auxiliary base material 12 may be performed by heating the auxiliary base material 12 by a heater different from the extruder.

Next, in the production method in this embodiment, the heated auxiliary base material 12 (see FIG. 1) is disposed into the mold 31 (see FIG. 2) (see step S2 of FIG. 4).

In the step of disposing the auxiliary base material 12, as illustrated in FIG. 5, one of a pair of the material handling robots 40 of the production device 20 moves the heated auxiliary base material 12 into the mold 31. More specifically, for example, the hand part 43 (indicated by chain double-dashed line in FIG. 5) of the material handling robot 40 (FIG. 5 indicated by chain double-dashed line) holds the plasticized auxiliary base material 12 in shape of a mattress (or a large cushion) (indicated by chain double-dashed line in FIG. 5) having been extruded from the above-described LFT-D extruder, on the other end face 44a side of the main body 44.

The other of a pair of the material handling robots 40 of the production device 20 is in a standby state, and the hand part 43 thereof stands still in a position away from the press mechanism 30.

At this time, the needle member 46a constituting the holding unit 46 of the hand part 43 illustrated in FIG. 3 is protruded from the other end face 44a of the main body 44 by the actuator 46b, which allows the needle member 46a to stick the auxiliary base material 12 (see FIG. 5). The needle member 46a which has stuck the auxiliary base material 12 is arranged in the main body 44 such that the axes Ax thereof intersect with each other on the other end face 44a side of the main body 44. The needle member 46a thus makes the stuck auxiliary base material 12 engaged on the other end face 44a of the main body 44. That is, the holding unit 46 holds the auxiliary base material 12 stuck by the needle member 46a, on the other end face 44a side of the main body 44. It is to be noted that, when the auxiliary base material 12 is held on the other end face 44a side, the rod member 45a of the pusher 45 dose not protrude from the other end face 44a, as illustrated in FIG. 3.

As illustrated in FIG. 5, the material handling robot 40 starts keeping the auxiliary base material 12 held by the hand part 43 warm. More specifically, the heater 47 (see FIG. 3) embedded in the main body 44 (see FIG. 3) heats the auxiliary base material 12. This makes it possible for the auxiliary base material 12 extruded from the LFT-D extruder to be kept in the plasticized state.

The material handling robot 40 then three-dimensionally moves the hand part 43 thereof which holds the auxiliary base material 12, and places the auxiliary base material 12 into the mold 31.

In the aforementioned step of disposing the auxiliary base material 12, as described above, a step of preforming the auxiliary base material 12 (see FIG. 1) is also conducted in parallel (see step S2 of FIG. 4).

As illustrated in FIG. 6, in the production device 20 in the preforming step, the material handling robot 40 moves the auxiliary base material 12 held by the hand part 43 to the lower mold 31b using the pusher 45.

Operations of the production device 20 in the preforming step are described further in detail.

As illustrated in FIG. 7A, the hand part 43 in the preforming step moves the auxiliary base material 12 to a prescribed position on the mold 31 (lower mold 31b).

At this time, as described above, the needle member 46a of the holding unit 46 sticks and holds the auxiliary base material 12 on the other end face 44a of the main body 44. The rod member 45a of the pusher 45 stays in the above-mentioned default position and does not protrude from the other end face 44a.

Next, in the preforming step, as illustrated in FIG. 7B, when the needle member 46a of the holding unit 46 moves backward into the main body 44, the auxiliary base material 12 is released from the holding unit 46. Then, the rod member 45a of the pusher 45 protrudes from the other end face 44a, to thereby press the auxiliary base material 12 toward the mold 31 (the lower mold 31b). This allows the auxiliary base material 12 to be released from the other end face 44a of the main body 44 and to be moved onto the lower mold 31b of the mold 31.

As illustrated in FIG. 7C, the rod member 45a of the pusher 45 works such that the auxiliary base material 12 is pressed against the lower mold 31b. At this time, the rod member 45a of the hand part 43 moves back and forth and presses the auxiliary base material 12 against the lower mold 31b a plurality of times, while the hand part 43 keeps on moving along an inner wall of the cavity by means of the drive part (not illustrated) and the arm part 42. A tip of the rod member 45a presses the auxiliary base material 12 such that the auxiliary base material 12 goes into even a corner or a concave portion formed on the cavity inner wall and closely adheres thereto. This allows the auxiliary base material 12 to be deformed and tailored to a cavity forming face of the lower mold 31b, after which the preforming step is terminated.

In the production method in this embodiment, the main base material 11 (see FIG. 1) is disposed in the mold 31 (see FIG. 2) (see step S3 of FIG. 4).

In the step of disposing the main base material 11, the main base material 11 in the plasticized state is disposed on the mold 31 (the lower mold 31b) via the heated auxiliary base material 12 (see FIG. 1). At this time, the main base material 11 is preferably disposed on the auxiliary base material 12 without contact with the mold 31 (the lower mold 31b).

In the step of disposing the main base material 11, as illustrated in FIG. 8, the other of a pair of the material handling robot 40 of the production device 20 moves the heated main base material 11 into the mold 31.

More specifically, for example, the hand part 43 (indicated by chain double-dashed line in FIG. 8) of the material handling robot 40 (indicated by chain double-dashed line in FIG. 8) holds the mattress-shaped (or large cushion-shaped) plasticized main base material 11 (indicated by chain double-dashed line in FIG. 8) which has been extruded from the aforementioned LFT-D extruder, on the side of the other end face 44a of the main body 44. The operation of holding the main base material 11 by the hand part 43 is performed similarly to that of the auxiliary base material 12. The material handling robot 40 then disposes the main base material 11 which is kept warm by the heater 47 (see FIG. 3) so as to maintain the plasticized state thereof, into the mold 31.

Next, in the production method in this embodiment, integral press molding of the auxiliary base material 12 and the main base material 11 is performed in the mold 31 (step S4 of FIG. 4).

In the step of integral press molding, the hand part 43 which has the main base material 11 arranged on the auxiliary base material 12 is moved to a standby position, and the auxiliary base material 12 and the main base material 11 are interposed and pressed between the lower mold 31b and the upper mold 31a.

At this time, the lifting and lowering part 33 lowers and presses the upper mold 31a against the lower mold 31b at a prescribed pressure. The main base material 11: thereby flows in the mold 31; is integrally molded with the auxiliary base material 12; and finally forms the thermoplastic resin composite material 10 (see FIG. 1) as an integrally molded object composed of the auxiliary base material 12 and the main base material 11, in the cavity in the mold 31.

It is further preferable that the upper mold 31a is equipped with a position-keeping movable mechanism such as a pad and a pin so as to maintain a shape of the auxiliary base material 12, in a case in which: the main base material 11 cannot be disposed on the auxiliary base material 12 due to constraint on shape of components or the like; a flow of the main base material 11 does not allow the auxiliary base material 12 to maintain a shape thereof; and failures such as deformation, disarrangement, and delamination occurs owing to the unfavorable flow.

It is assumed herein that a temperature of the mold 31 in this embodiment is, for example, but not limited to, from about 100 degrees C. to about 200 degrees C., in accordance with a type of the thermoplastic resin used.

Then, in the production method in this embodiment, the integrally molded thermoplastic resin composite material 10 is taken out from the mold 31, which terminates a set of the steps.

<Functions and Effects>

Next are described functions and effects made by the production method and the production device in this embodiment.

In the production method and the production device in this embodiment, when the main base material 11 containing thermoplastic resin is disposed in the mold 31 (lower mold 31b), the main base material 11 is disposed via the previously-heated auxiliary base material 12. In this embodiment as described above, fluidity of the thermoplastic resin in the mold 31 is maintained in good state by heat of the auxiliary base material 12.

In this embodiment, the main base material 11 containing thermoplastic resin and the auxiliary base material 12 are pressed together and integrally molded in the mold 31, to thereby obtain the thermoplastic resin composite material 10. In this embodiment, unlike in the conventional technology (see, for example, Patent Documents 1 and 2), a heating step for curing thermosetting resin can be omitted, which results in a high productivity.

Generally, when resin composite material having a high mechanical strength is desired by means of press molding in a mold, because raw materials thereof is insufficient in mold conforming capability, such a method is taken in some cases that, for example, fragments of sheet-shaped raw materials are disposed in the mold. The method thus has a problem that the resin composite material is low in productivity. Unlike in the method, in this embodiment, high fluidity of the thermoplastic resin in the mold 31 is maintained, which eliminates a need of fragmentation of sheet-shaped raw materials. Thus, in this embodiment, productivity of the thermoplastic resin composite material 10 is high without such a fragmentation step.

When thermoplastic resin is used as a matrix and a resin molded article made up of the thermoplastic resin and carbon fiber having an increased strength is desired, as described above, fluidity of the thermoplastic resin in the mold becomes insufficient, which may cause a weld line, a sink, or the like. In order to improve such insufficient fluidity of the thermoplastic resin, a molding method using a heat and cool mold may be used. In the molding method, when molding a resin molded article, a temperature of a mold is made high so as to keep good fluidity of the thermoplastic resin in the mold. Then, the temperature of the mold is made low so as to cool and solidify the thermoplastic resin in the mold, after which the resin molded article is taken out from the mold. The molding method has, however, a problem that a molding cycle time becomes prolonged because raising and lowering the mold temperature takes time.

Unlike in the molding method, in this embodiment, there is no need of raising or lowering a mold temperature from mold closing at a time of molding until mold opening at a time of demolding a molded article. This results in a high productivity without a prolonged molding cycle time.

It is to be noted that this embodiment does not exclude a step of cooling a mold but can include the step of cooling a mold.

Generally, when sheet-shaped raw materials are disposed in a mold and are press molded, there is a method of preforming the sheet-shaped raw materials. The preform method is used for supplementing mold conforming capability of the sheet-shaped raw materials. In the preform method, prior to disposing raw materials in a mold, the raw materials are preformed using another mold. The preform method is suitably applied to molding with raw materials having insufficient mold conforming capability.

The preform method has, however, a problem that a scale of a production facility is increased because another mold or a press machine is required, resulting in an increase in cost of manufacturing a molded article. Another problem is that, in the preform method, a molding cycle time is prolonged because raw materials are preformed in one mold and are then transferred to another mold for regular molding.

Unlike in the method described above, in this embodiment, the mold 31 used for molding the thermoplastic resin composite material 10 is also used for preforming. This can prevent a production cost of a molded article from being increased and also prevent a molding cycle time to be prolonged.

The present invention has been described above with reference to the embodiment thereof. The present invention is not, however, limited to the aforementioned embodiment, and various modifications are possible within a scope not departing from the gist of the present invention.

In the production method in the embodiment described above, explanation has been made assuming that the production method uses the production device 20 (see FIG. 2). The present invention is not, however, limited to the production device 20, and any other production device having a different structure therefrom can be used as long as the device of interest is suitable for performing the steps described above.

In the production device 20 (see FIG. 2) in the embodiment described above, the hand part 43 of the material handling robot 40 (the transfer mechanism) is configured to have the pusher 45 (the press mechanism). That is, in the production device 20 (see FIG. 2), the material handling robot 40 (the transfer mechanism) and the pusher 45 (the press mechanism) are structured as a unitary component. The production device of the present invention may have, however, the transfer mechanism and the press mechanism separately from each other. The above-mentioned production device in which the press mechanism is provided separately from the transfer mechanism includes, for example, though not illustrated, a production device that includes: a base member which is three-dimensionally movable by means of an arm part other than the arm part 42 (see FIG. 2); the rod member 45a (see FIG. 2) and the actuator 45b (see FIG. 2) each of which is attached to the base member.

In the production device 20 (see FIG. 2) in the above-described embodiment, one of a pair of the material handling robots 40 (see FIG. 2) is configured to transfer the auxiliary base material 12 (see FIG. 5), and the other is configured to transfer the main base material 11 (see FIG. 8). In a production device having a structure different from that of the above-described embodiment, any one of the material handling robots 40 may be configured to transfer both the main base material 11 and the auxiliary base material 12. That is, the production device of the present invention can be configured to have only a single unit of the material handling robot 40 or two or more units of the material handling robots 40.

In the production method in the above-described embodiment, when the production device 20 performs operations in the step of disposing the auxiliary base material 12 (see FIG. 5) and when the production device 20 performs operations in the step of disposing the main base material 11 (see FIG. 8), any one of a pair of the material handling robots 40 is assumed to stop an operation thereof (in a standby state).

In the production method of the present invention, however, any one of the material handling robots 40 which is in the standby state may be made to perform an operation of holding the main base material 11 or the auxiliary base material 12, using the hand part 43 thereof, such that the main base material 11 or the auxiliary base material 12 necessary in the next step becomes ready to be used. This makes it possible to further reduce molding cycle time.

DESCRIPTION OF REFERENCE NUMERALS 10 thermoplastic resin composite material
11 main base material
12 auxiliary base material
20 production device
30 press mechanism
31 mold
31a upper mold
31b lower mold
32 base
33 lifting and lowering part
40 material handling robot (transfer mechanism)
41 support part
42 arm part
43 hand part
44 main body
45 pusher (press mechanism)
45a rod member
45b actuator
46 holding unit
46a needle member
46b actuator
47 heater
48 attaching unit
Ax axis

The invention claimed is:

1. A production method for thermoplastic resin composite material in which a main base material containing thermoplastic resin and a sheet shaped auxiliary base material are integrally molded and are made into composite material, the production method, comprising the steps of:
heating the auxiliary base material;
disposing the heated auxiliary base material in a mold;
pressing a plurality of portions of the heated auxiliary base material disposed in the mold against the mold a plurality of times, the pressing being performed along an inner wall of a cavity of the mold, so as to tailor the heated auxiliary base material to the mold;
after pressing the plurality of portions of the heated auxiliary base material disposed in the mold against the mold the plurality of times, disposing the main base material in the mold on the heated auxiliary base material;
closing the mold, and pressing together and integrally molding the heated auxiliary base material and the main base material; and
taking out the integrally-molded thermoplastic resin composite material from the mold,
wherein the step of pressing the plurality of portions of the heated auxiliary base material disposed in the mold against the mold the plurality of times, so as to tailor the auxiliary base material to the mold, is performed using a press mechanism comprising a rod member and actuator configured to move the rod member.

2. The production method for thermoplastic resin composite material according to claim 1,
wherein, after the step of heating the auxiliary base material, the heated auxiliary base material is disposed in the mold while the heated auxiliary base material is kept warm.

3. The production method for thermoplastic resin composite material according to claim 1,
wherein the main base material contains the thermoplastic resin in which carbon fiber of a prescribed length is contained in a dispersed state.

4. The production method for thermoplastic resin composite material according to claim 2,
wherein the main base material contains the thermoplastic resin in which carbon fiber of a prescribed length is contained in a dispersed state.

* * * * *